United States Patent

[11] 3,630,258

[72] Inventor Lawrence R. Sperberg
 6740 Fiesta Drive, El Paso, Tex. 79912
[21] Appl. No. 743,345
[22] Filed July 9, 1968
[45] Patented Dec. 28, 1971
 Continuation-in-part of application Ser. No. 504,768, Oct. 24, 1965, now Patent No. 3,397,729. This application July 9, 1968, Ser. No. 743,345

[54] TIRE HAVING PLIES MADE OF FIBERGLASS AND NYLON
 3 Claims, 5 Drawing Figs.
[52] U.S. Cl. .................................................. 152/356, 152/359
[51] Int. Cl. ..................................................... B60c 9/10
[50] Field of Search........................................... 152/354, 355, 356, 357, 358, 359, 361; 57/140

[56] References Cited
UNITED STATES PATENTS
| 3,095,026 | 5/1963 | Weber | 152/355 |
| 3,315,722 | 4/1967 | Marzocchi et al. | 152/359 |
| 3,115,921 | 12/1963 | Leibee | 152/361 |

FOREIGN PATENTS
| 700,790 | 12/1964 | Canada | 152/354 |
| 1,445,642 | 6/1966 | France | 152/357 |

OTHER REFERENCES
Comparison Table from p. 11 of " Fiberglas Yarns for the Textile Industry," published by Owens-Corning Fiberglas Corp., New York, N.Y. in May, 1951.

Primary Examiner—Arthur L. La Point
Assistant Examiner—George H. Libman
Attorney—Marcus L. Bates ABSTRACT: A bias-constructed tire having a carcass built of several plies with the innermost ply being made of fiberglass tire cord material and the outermost ply being made of polyamide tire cord material as the principal reinforcing fiber.

PATENTED DEC 28 1971 3,630,258

INVENTOR.
LAWRENCE R. SPERBERG
BY
MARCUS L. BATES

TIRE HAVING PLIES MADE OF FIBERGLASS AND NYLON

CROSS-REFERENCE TO RELATED PATENT APPLICATION

This application is a continuation-in-part of application Ser. No. 504,768 filed Oct. 24, 1965, now U.S. Pat. No. 3,397,729.

BACKGROUND OF THE INVENTION

Nylon, as used herein, relates to a synthetic textile comprised of a polyamide resin. Rayon relates to a synthetic textile comprised of a modified cellulose filament, including the E.H.M. (extra high modulus) material as well as Tyrex.

Nylon has gradually replaced rayon as the principal tire cord in the field of vehicle tires. Several years accumulated data of road test results using truck tires that were fabricated with nylon cords show failure patterns unlike any that were associated with previous tests of rayon tire cords. The failure of nylon truck tire cords may be attributed to nylon fusion. Test data show conclusively that this fusion of the nylon cord is a direct result of the intense heat buildup on the inside of the tire. In a truck tire the presence of nylon fusion is especially of interest since a truck tire is normally subject to more severe usage than is a passenger or automotive tire, consequently, nylon fusion is more prominent in the truck tire industry, and it is assuming the stature of a major problem in passenger tires because of the many lawsuits filed wherein said delitescent defect is a major cause of failure.

The problem of nylon fusion is particularly dangerous in addition to being expensive for the fusion cannot be detected by one unskilled in the art since close examination of the tire interior is required to detect the beginning of the fusion process. Usually the occurrence of nylon fusion, or at least the effect thereof, is realized when the tire explodes. The problem is well hidden for it required several hundred attempts by patentee in a carefully controlled test program to discover the reason for this phenomenon. The problem is becoming acute and is beginning to be recognized as the source of great loss of life and property, for one may be driving along at a low rate of speed in close proximity to pedestrians and experience a violent tire explosion. This explosion may occur at any speed, after any length of driving, under almost any severity of driving conditions.

There is an area in the shoulder of a truck tire where a maximum amount of bending or flexing takes place. This area may be very narrow or sharp, depending upon the design and construction features of the tire. In a well-designed tire, this area of maximum flexing is spread over a greater width than a tire of inferior construction. In nylon tires, discoloration on the interior of the tire develops along this area of maximum flexing. The intensity of the heat buildup and the sharpness of the flex line control the appearance of the discoloration or heat band which may vary in appearance from a light reddish brown to nearly black and vary in width from one-half to 3 inches or more. In a well-designed tire, heat bands may not appear or if they do appear they may be relatively broad and indistinct. In better designed tires the heat bands are very broad and have indistinct edges and in some instances the two heat bands may actually grow so broad as to unite in the tire crown, forming a continuous discolored area extending from shoulder to shoulder of the tire. In a poorly designed tire these heat bands may be concentrated in a pair of continuous narrow bands which seem to indicate a more intense condition of nylon fusion that will accordingly bring about a more rapid failure. In the file of truck tires very few nylon tires fail to develop heat bands. In the field of passenger tires only a moderately few tires actually develop inside heat bands.

A nylon tire which indicates excessive heat buildup by the above-mentioned heat bands is in a state of advanced deterioration since the nylon cord has undergone some degree of chemical or physical change. Such a tire may continue to run some indeterminable period, but it is only a matter of time until it will explode. Should the heat bands appear late in the tread life, so as to enable the tire to live to be recapped, such a tire would in all probability fail prior to the time at which it might be anticipated to wear out.

Nylon fusion maybe attributed to any combination of several factors that result in a change in the cord, as a consequence of longtime exposure to temperatures generated by the running tire. One, the nylon cord can be undergoing both a chemical and physical change. Two, the dip coat that acts as the bond between the nylon filaments and the rubber skim compound can be undergoing such a change. Or, three, the rubber compound adjacent to the individual cords can be undergoing a selective aging process that results in a hardening of the compound. Any combination of these factors is termed nylon fusion. It is known that the nylon cord on the leading edge of the biased cord loses half its tensile strength under some conditions of service which loss may also be a manifestation of the fusion process.

It is evident that the focal point of attack along the flex line starts with the inside ply of a tire and that this failure progresses outward through the tire, that is, towards the ply adjacent the tread. Once the attack starts, it proceeds at an increasingly rapid rate until the internal pressure exceeds the external strength of the tire, whereupon the tire explodes without warning, dismembering the tire along the flex line heat band. The nylon apparently loses a large portion of its strength in the inside ply with each successive ply losing a little less strength as the deterioration progresses from the inside to the outside of the tire.

Rayon truck tires have not had the type failures that are characteristic of nylon tires. Tests show that rayon suffers only a slight loss in tensile strength after running 100,000 miles or more, when properly protected, even though the decomposition temperature of rayon is well below the melting point of nylon. The phenomenon of nylon fusion has not found its counterpart in the cords of rayon plies. On contrary, rayon tires generally fail from the outside. Rayon tires are susceptible to deterioration caused by moisture absorption, whereas nylon appears impervious to moisture. Wet rayon loses up to 70 percent of its dry strength, and as cracks appear, rayon absorbs moisture allowing further cracking and deterioration which results in loss of tensile strength with possible destruction of the tire. The deleterious and delitescent effect of fusion, change of cord dip chemical, and aging of adjacent rubber compound is not as evident in the rayon tire as in the nylon tire since patentee has found no evidence of the telltale heat bands in the rayon tires.

In light of the above problems associated with fusion and moisture deterioration, it appears obvious that both the nylon and rayon tire is not the panacea, although each embraces desirable qualities, in the tire field.

It is an object of this invention to provide a vehicle tire having the desirable performance of nylon cords while avoiding the problems associated with nylon fusion.

Another object of this invention is to provide a superior tire that is capable of withstanding the temperature levels and stresses encountered under severe driving conditions.

A further object of this invention is to provide a tire construction having improved traction, reasonably low permanent set, and high resistance to cracking.

Still another object of this invention is to provide an improved bias-constructed tire in which a high energy impact resistant cord having low bending stiffness and high bending life coupled with excellent resistance to moisture deterioration is used as the principal outside poly cord material. Polyamide exemplifies this material. Rayon, certain polyesters, and fiber glass possess superior resistance to deterioration when exposed to heat for long periods of time and accordingly, are used as the principal inside cord material.

An additional object of this invention is to set forth a novel two-ply tire utilizing the novel principles of construction outlined herein; and Other objects of this invention will become apparent to those skilled in the art from the following remaining disclosure.

Figure 1:
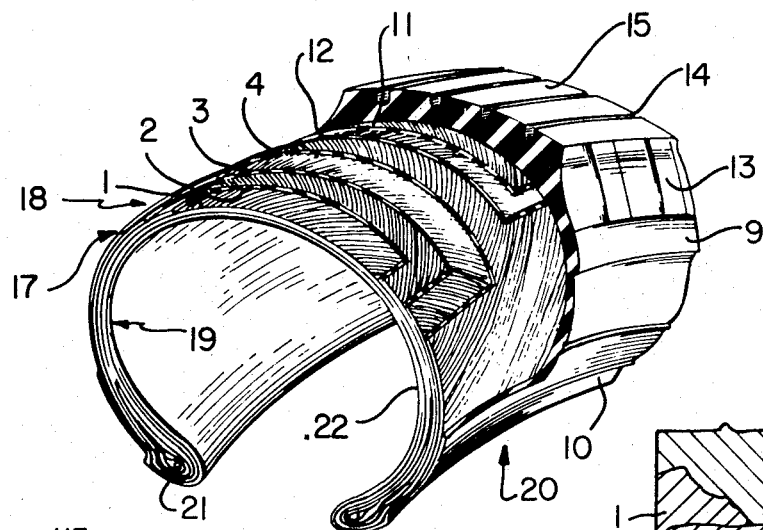
FIG. 1 shows a conventional four-ply tire construction with parts broken away for clarity.

Referring to the drawing, and particularly to FIG. 1, reference numeral 1 indicates the inner or first ply of a biased-constructed tire having adjacent plies 2, 3 and 4, the fourth ply being adjacent to the tread. Numeral 9 indicates the buffing or scuff rib and numeral 10 the mounting guide rib. The first and second breaker plies or strips are represented by numerals 11 and 12. The breaker strips 11 and 12 are found only in exceptionally heavy-duty passenger tires and are not usually fabricated into the ordinary vehicle passenger tire. These breakers 11 and 12 provide a means of increasing the ply rating of a tire.

The buttress of the tire is seen at 13. The tread ribs 15 are separated by tread grooves 14. Arrows at numerals 17 and 18 indicate the tire flexing region. The area between arrows 17 and 19 indicate the tire body. The bead wire is shown at 21, and 22 is the inner liner compound.

Figure 2:
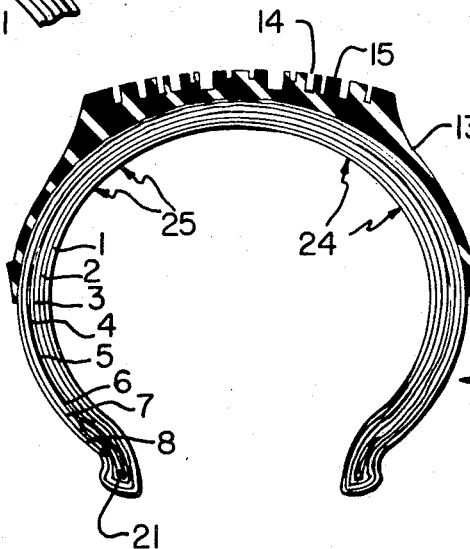
FIG. 2 shows a section of a conventional truck tire having eight plies.

Looking now to FIG. 2, wherein like numerals are used to indicate like elements, there is seen a conventional bias-constructed truck tire 23 having eight plies represented by numerals 1 through 8 wherein numeral 1 is the first or inner ply and numeral 8 is the last or outside ply adjacent the tread. Numerals 24 and 25 indicate the area where discoloration may first appear on the inside ply of the tire.

Figure 3:
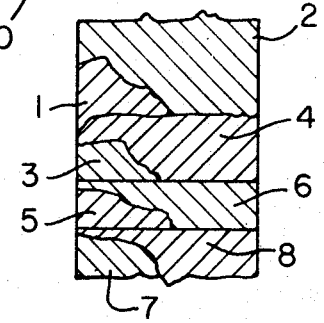
FIG. 3 is a diagrammatical plan view, with certain parts broken away, and taken from the top of a tire such as seen in FIG. 2.

In FIG. 3, the innermost ply 1 corresponds to the innermost ply 1 of FIG. 1, and as further seen in FIG. 3 there are three pairs of oppositely biased plies, that is, ply pairs 1 and 2, 3 and 4, 5 and 6. Where deemed desirable, a breaker can be arranged circumferentially about the outermost ply in a manner as seen at 11 and 12 in FIG. 1, as is known to those skilled din the art.

Figure 4:
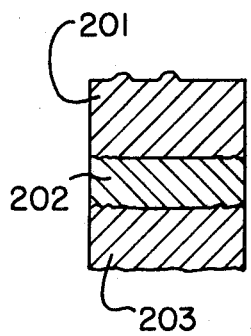
FIG. 4 is a diagrammatical plan view similar to FIG. 3.

FIG. 4 sets forth a three-ply tire having an innermost ply 201 of fiber glass and an outermost ply 203 of polyamide. For purpose of illustration the plies are of biased construction. Where deemed desirable a breaker can be included in the construction in the illustrated manner of FIGS. 1 and 3.

Figure 5:
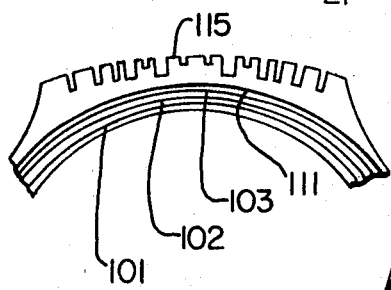
FIG. 5 is a diagrammatic sectional view of part of a tire provided with carcass plies arranged according to one embodiment of the invention.

FIG. 5 is a diagrammatic sectional view of part of a tire which includes plies 101, 102, 103, and ply 111. A tread wearing composition is seen at 115. The plies 101, 102 may be oppositely biased fiber glass plies while ply pair 103, 111 may be oppositely biased polyamide plies. Alternatively the indicated ply-and-breaker arrangement can be comprised of oppositely biased pairs of plies 101, 102 made of fiberglass and polyamide while the oppositely biased pair of plies 103, 111 are breaker plies made of polyamide, as seen in FIG. 4.

A structurally perfect tire, so far as concerns the tire cord textile, is deemed one that has low elongation under load, excellent adhesive power, high impact energy, excellent bending life, low bending stiffness, low heat growth, high moisture resistance, and low tendency towards fusion. No known material exhibits all of these desirable properties; however, applicant has devised a novel construction which will enable fabrication of a tire that, as an end result, embraces these heretofore unattainable attributes.

Of known tire cord materials, steel, rayon, including the extra high modulus rayon; fiber glass, polyesters, and the polyamides (nylon 6 and 66) have achieved the most prominence. Applicant's novel tire construction employs a combination of these known textiles in a novel arrangement wherein their outstanding properties are utilized while their or poor or mediocre properties are minimized or hidden. This novel tire construction places the materials having high impact energy, high elongation, high adhesive power, long or high bending life, low bending stiffness, poor fusion characteristics, and high moisture resistance in the outer plies; and places the materials having the low moisture resistance, high fusion resistance characteristics and low elongation under loads on the inside plies; with materials having properties or characteristics intermediate of these two extremities being placed in the center or between the inner or outer plies.

Of the above materials, the polyamides are best suited for the outside ply material since its bending life far exceeds the others, and its impact energy and moisture resistance is highly satisfactory; hence, nylon is used in the below illustrative examples to exemplify an outside ply material having the above-outlined desirable properties.

The rubber industry recognizes glass fiber as an interesting and potentially valuable reinforcing textile for tires. While the fiber suffers interfilament chafing failures and fiber-to-rubber adhesion failure during flexing, the advantages of great strength, resistance to stretch growth, retention of strength above 450° F., nonflammability and chemical inertness tend to offset the undesirable features of lower impact energy and lower bending life. Glass cord is only sightly more extensible than steel while weighing only one-third as much as steel. The problem of chafing failures and fiber-to-rubber adhesion failures during flexing have been partially overcome recently by chemically bonding the individual filaments of glass to the rubber.

Polyolefins and polyesters, as reinforcing textiles, offer low cost, good moisture resistance, high strength, and good process. Fiber glass resistance material to the resistance to the fusion process. Steel and fiber glass exhibit very All of the polyolefins, except for polypropylene, have high melting points approaching that of nylon while polyester exceeds the melting point of nylon. Adhesion failures, such as found in fiber glass is one of the undesirable features associated with these two textiles.

Rayon, and the extra high modulus rayon, for some reason are essentially impervious to the fusion process. Fiberglass and steel also exhibit resistance to the fusion process. Steel and fiber glass exhibit very poor adhesive power, and a low bending life; hence, these materials of construction are best suited for the inside plies where they are protected from the detrimental effects associated with the outside ply location. Rayon is used in the below examples as being an exemplification of the materials of construction suitable for the inside plies.

Ordinary rayon, polyester, and the polyolefins fall in between the properties outlined above for the inner and outer plies, and hence find utility as the plies adjoining either of the above materials, or the central plies.

In this respect, it should be noted that the requirement for low elongation the outer ply material is not deemed of prime importance in this novel construction. While this is a departure from the present accepted tire-manufacturing technique, it is nevertheless considered of secondary importance in the selection of an outer ply material since the outside ply can grow no more than is permitted by the growth of the inside ply material; hence, the requirement of low elongation or low growth rate is shifted to the inside ply which results in a lowering of the criticality of elongation of the outer plies.

Improved resistance to separation and resistance to groove cracking are obtained by using a material having low growth properties on the inside plies, simply by the expedient of controlling or restricting tire growth.

Since nylon resists the effects of moisture and shock while rayon, polyester, and fiber glass resist the effects of high temperature, the present novel tire is constructed using rayon, polyester, for fiber glass cord on the inside plies and using nylon cord on the exterior plies. This results in a much superior tire than one constructed entirely of the above-mentioned synthetic cord. The prime advantages of the present novel tire is that the heat-resistant inner plies are protected against the effects of moisture and shock by the outside nylon plies, while the moisture-resistant shock-resistant nylon is protected from the high temperatures associated with the inside plies.

It should be understood that the overall characteristics of the tire construction using a multi-ply configuration will be related to and governed by the relative number of growth and fusion resistant rayon plies used on the inner plies compared to the number of moisture-resistant, high impact energy nylon plies used in the outer plies including the breaker ply. The relationship of these elements must be of a ratio to first overcome the problem of nylon fusion, followed by the desirability of low permanent set and the overall ply rating. Thus it is evident that a tire can be fabricated having a minimum of four plies and up to as many as 14 plies with or without breakers to give a strength equivalent to as many plies as desired. In some aircraft tires the number of plies may even exceed this number.

In the instant novel bias-constructed truck tire, as in all bias-constructed tires, the adjacent plies run transverse to each other, noting for example FIG. 1 wherein ply 1 compared to ply 2 is adjacently and transversely related to each other. Hence, in a properly designed tire, each pair of adjacent oppositely biased plies should be of like material since the stresses of the plies on each side of the complete tire structure may otherwise be unequal. In a four-ply automotive or truck tire, the two adjacent outer plies 3 and 4 are accordingly fabricated of nylon cord for example, while the two adjacent oppositely biased inner plies 1 and 2 are fabricated from either rayon, polyester, or fiber glass. Thus the latter three textiles replace the nylon in an area which is the first to develop signs of heat bands. In the instant invention, the nylon plies 3 and 4 are placed in an area where they will not be subjected to the effects that cause the fusion process, and at the same time provide the rayon, polyester, or fiber glass with a moisture barrier and from high impact loads. Thus each material is advantageously placed so as to utilize the outstanding properties of the material and so as to minimize the poor properties of the materials. In effect, then, the nylon is a moisture and impact barrier to the rayon, polyester, and fiber glass which in turn serve as a heat barrier to the nylon.

Considering now the eight-ply truck tire of FIG. 2, there are seen four sets of pairs of plies in the biased-constructed tire. The adjacent plies are considered in pairs since any two adjacent plies are oppositely biased, and to obtain a structurally balanced tire each side of the tire must be symmetrically balanced moduluswise. That is, the same forces must be present in each side of the tire, hence two adjacent oppositely biased plies fabricated from identical or closely matched material will provide a tire with symmetrically balanced forces. The instant eight-ply tire is therefore advantageously divided into four pairs of plies, with plies 1 and 2 forming the first pair, plies 3 and 4 the next pair, plies 5 and 6 the third pair, and plies 7 and 8 the last or fourth pair of plies.

Nylon, being highly resistant to deterioration from moisture and having the ability to withstand high impact loads, is advantageously used as the cord fiber in the last pair of plies, number 7 and 8 adjacent the tread.

Fiber glass may be alternatively used as the reinforcing textile in the two adjacent plies furthermost removed from the tread in the flex area where nylon fusion is ordinarily first observed. The excellent ability of fiber glass to withstand high temperatures makes this choice of textile ideal for the innermost plies numbers 1 and 2 since the remaining plies will protect the glass fibers from high impact stresses. In such a construction, the central plies preferably are of rayon since this material, although unable to withstand the high temperatures as well as the polyesters and polyolefins (except for polypropylene), exhibits greater ability to withstand flexing when properly protected against climatic conditions than do the polyesters and polyolefins.

Five examples of truck tire manufacture:

EXAMPLE 1: A truck tire having eight plies as in FIG. 2 was designed using nylon cord fiber in the four plies designated by numbers 5, 6, 7, and 8. The next adjacent two plies number 4 and 3 were fabricated using rayon fiber as the principal reinforcing textile. Plies 1 and 2 were fabricated using a fiber glass fabric having the individual glass filaments chemically bonded to the rubber in the ply.

The tire in example 1 carries fiber glass at the focal point of heat buildup with rayon plies between the fiber glass and nylon. The rayon plies are protected from external atmospheric conditions by the nylon while the nylon is at the same time removed from the area which is subjected to fusion. The superiority of this tire is attributed to the glass being amply protected from impact by the rayon and nylon plies so as to reduce chafing failures and fiber-to-rubber adhesion failures.

EXAMPLE 2: A tire was designed using polyester fabric as the reinforcing textile in plies number 3 through 6, FIG. 2. The last two plies 7 and 8 were of nylon, as in example 1, and the first two plies, numbers 1 and 2 were constructed of fiber glass, as in example number 1.

This tire utilized four plies of polyester since this textile is considered less efficient, as compared to rayon, in tolerating the effects of longtime heat exposure as encountered in a running tire, while possessing other desirable properties intermediate between fiber glass and nylon. Furthermore, the low elongation of polyester contributes toward a dimensionally stable tire.

EXAMPLE 3: A four-ply truck tire having two breaker plies was constructed using a polyamide textile in the two breaker plies 11 and 12, FIG. 1, and in the two plies 3 and 4 adjacent the breaker plies. The inside plies, 1 and 2, were fabricated from an extra high modulus rayon as ply number 1 of FIG. 1, whose properties were selected to closely approximate a polyester which was used as the textile in ply number 2. These two plies, 1 and 2, were carefully selected from different textile materials, yet the properties of these two materials were closely related so as to retain structural symmetry in ply 1 as compared to ply 2. The rayon versus polyester showed the following properties: elongation at 20 percent breaking load 0.7/1.0; impact energy 500/1,800; bending life 1,900/4,200; heat growth 0.3/0.5. Thus while maintaining structural symmetry by adjacent cords having equal modulus heat growth characteristics, an overall improvement in impact energy resistance along with a much higher fatigue resistance has been accomplished by the use of the polyesters in ply number 2.

EXAMPLE 4: A polyolefin tire cord in lieu of the polyester cord was designed into the central plies numbers 3 through 6, FIG. 2, as in the preceding example number 2. Nylon was retained as plies numbers 7 and 8, and fiber glass was retained as plies numbers 1 and 2, for substantially the same reasons as outlined above.

EXAMPLE 5: A two-ply bias-constructed tire having a pair of breaker plies was fabricated using nylon in both breaker plies, polyesters in the ply adjacent the breaker plies, and extra high modulus rayon as the inside ply textile material. The polyester and rayon properties were closely matched as in the preceding example.

EXAMPLE 6: A two-ply bias-constructed tire was designed having rayon in ply 1 and polyester in ply 2 so as to retain structural symmetry as regards cord modulus an and heat growth while enhancing resistance to high energy impact, and imparting a higher flex life and a lower bending stiffness than would be realized using two plies of ordinary rayon.

It will be noted in the above examples that a high impact energy material having a high bending life along with excellent moisture resistance is always used in the ply adjacent the tire tread and that material having high resistance to heat deterioration is always used in the plies furthest removed from the tire tread. There has previously been proposed a vehicle tire construction using nylon in the plies adjacent to the tread with rayon fabric as the textile in the plies furthest removed from the tread. The present novel tire construction carries the process of eliminating nylon fusion a step further in order to give the maximum benefit of materials of construction presently available in the truck tire field.

It is considered within the comprehension of this invention to relocate the various textile materials with respect to each other, or, for that matter, to eliminate one of the ply textile materials so long as the concept of choosing the relative position of the ply material is carried out by the novel practice outlined herein. However, the novel solution to eliminating nylon tire explosions due to deterioration at the flex line, so as to avoid nylon fusion is best practiced from a consideration of the appended claims which are to be considered the metes and bounds of this invention.

I claim:

1. A pneumatic tire having a carcass built up of several bias-constructed plies and including a ground-contacting tread portion about the outer periphery of the carcass, each said ply including a tire cord material therein;

the tire cord material in the ply furthest removed from the tread portion being made of fiber glass; and
the tire cord material in the ply adjacent to the fiber glass ply being made of polyamide;
said plies of the tire are limited to two oppositely biased plies.

2. The pneumatic tire of claim 1 wherein a breaker in included about the outermost polyamide ply.

3. The pneumatic tire of claim 1 wherein nylon breaker is included about the outermost polyamide ply.

* * * * *